US010782959B1

(12) United States Patent
Schambureck et al.

(10) Patent No.: US 10,782,959 B1
(45) Date of Patent: Sep. 22, 2020

(54) STORING A FILE LIST FOR A PUBLIC FILE REPOSITORY AS A FILE TO AVOID RATE LIMITS ON FILE LIST REQUESTS

(71) Applicant: International Business Machines Corporation, Armonk, NY (US)

(72) Inventors: Nicholas Calvin Schambureck, Rochester, MN (US); Francis Gerard Malin, Rochester, MN (US); Sebastian Ramirez Rodriguez, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/360,192

(22) Filed: Mar. 21, 2019

(51) Int. Cl.
*G06F 9/44* (2018.01)
*G06F 8/65* (2018.01)
*H04L 29/12* (2006.01)
*H04L 29/08* (2006.01)

(52) U.S. Cl.
CPC ............ *G06F 8/65* (2013.01); *H04L 61/2007* (2013.01); *H04L 67/34* (2013.01)

(58) Field of Classification Search
CPC ........................................................ G06F 8/65
See application file for complete search history.

(56) References Cited

U.S. PATENT DOCUMENTS

| 9,378,100 | B2 | 6/2016 | Lebert |
| 9,734,155 | B2 | 8/2017 | Heemskerk |
| 10,152,265 | B1 | 12/2018 | Tomayko |
| 2005/0108551 | A1* | 5/2005 | Toomey ................... G06F 21/31 713/185 |
| 2006/0291443 | A1* | 12/2006 | Harrington ....... H04L 29/12367 370/351 |
| 2009/0307135 | A1 | 12/2009 | Gupta |
| 2010/0325199 | A1* | 12/2010 | Park ......................... G06F 16/10 709/203 |
| 2014/0344224 | A1* | 11/2014 | LeBert .................. G06F 16/958 707/684 |
| 2016/0092173 | A1* | 3/2016 | Rodrigues ............... G06F 16/00 |
| 2017/0034023 | A1 | 2/2017 | Nickolov |

OTHER PUBLICATIONS

Stevens, Marc, "Explore the new features in Cloud Automation Manager version 2.1.0.2", Grace Period Disclosure Document, Published on Apr. 9, 2018 / Updated on May 7, 2018, 3 pages, <https://developer.ibm.com/cloudautomation/2018/04/09/cloud-automation-manager-v2-1-0-2/>.

* cited by examiner

*Primary Examiner* — Hang Pan

(74) *Attorney, Agent, or Firm* — David B. Woycechowsky

(57) ABSTRACT

A technique for use by a first system of computers sharing a common IP address, the technique including the following operations: (i) transferring a first software bundle of files to a public repository (PR); (ii) requesting a current version of the first file list from the PR; (iii) receiving the current version of the first file list from the PR; (iv) generating a current version file list file (CVFLF) based on the current version of the first file list; and (v) storing the CVFLF at a first storage location from which the CVFLF can be downloaded.

15 Claims, 5 Drawing Sheets

STORING A FILE LIST FOR A PUBLIC FILE REPOSITORY AS A FILE TO AVOID RATE LIMITS ON FILE LIST REQUESTS

STATEMENT REGARDING PRIOR DISCLOSURES BY THE INVENTOR

The following disclosure(s) are submitted under 35 U.S.C. 102(b)(1)(A): DISCLOSURE(S): "Explore the new features in Cloud Automation Manager version 2.1.0.2", Marc Stevens, Published on Apr. 9, 2018/Updated May 7, 2018, 3 pages.

BACKGROUND

The present invention relates generally to the field of rate-limited file repositories, and more particularly to use of rate limited file repositories in an automated testing environment.

In revision control systems, a file repository is a data structure that stores metadata for a set of files or directory structure. Depending on whether the version control system in use is distributed (for instance, Git or Mercurial) or centralized (Subversion or Perforce, for example), the whole set of information in the file repository may be duplicated on every user's system or may be maintained on a single server. The metadata typically includes: (i) an historical record of changes in the repository; (ii) set of commit objects; and (iii) a set of references to commit objects, called heads. Typically, a primary purpose of a repository is to store a set of files, as well as the history of changes made to those files. One currently conventional type of file repository is called GitHub.

Some file repositories are rate limited, meaning that the maximum amount, or rate, of incoming and outgoing data to/from the repository is limited. Typically, the reason for implementing rate limits is to allow for a better flow of data and to increase security by mitigating attacks such as denial of service type attacks. Some types of rate limiting include: (i) user rate limiting, which limits amount, or rate, of data transfer on a per user basis; (ii) geographic rate limiting limits data transfer with respect to various geographic areas; and (iii) server rate limiting which defines rate limits on a server-level basis. The REST (representational state transfer API (application program interface) for the public GitHub file repositories has a rate limit setting the maximum number of anonymous requests per hour that can be made to that API from a single IP address. Various types of rate limits are sometimes implemented by the use of tokens, such that permission to access the restricted data is determined based on whether the user has a token available that can be "spent" on the access to the restricted data.

The concept of "run time" is known. In computer science, run time, runtime or execution time is the time during which a program is running (executing) or when repositories are being consulted by end users. Run time is different than other program lifecycle phases such as compile time, link time, build time and load time and load time. In the context of software repositories, build time is when the software repositories are being prepared for use by end users.

The Wikipedia entry for Jenkins states, in part, as follows as of 5 Mar. 2019: "Jenkins is an open source automation server written in Java. Jenkins helps to automate the non-human part of the software development process, with continuous integration and facilitating technical aspects of continuous delivery. It is a server-based system that runs in servlet containers such as Apache Tomcat. It supports version control tools, including AccuRev, CVS, Subversion, Git, Mercurial, Perforce, TD/OMS, ClearCase and RTC, and can execute Apache Ant, Apache Maven and sbt based projects as well as arbitrary shell scripts and Windows batch commands . . . . Builds can be triggered by various means, for example by commit in a version control system, by scheduling via a cron-like mechanism and by requesting a specific build URL. It can also be triggered after the other builds in the queue have completed."

SUMMARY

According to an aspect of the present invention, there is a method and/or computer program product for use by a first system of computers sharing a common IP address that performs the following operations (not necessarily in the following order): (i) transferring, from the first system of computers, through a communication network and to a second system of computers that stores a first file repository, a first software bundle of files so that: (a) the first software bundle of files is stored in and is downloadable from the first file repository, and (b) the first bundle of files is added to a first file list for the first file repository stored in the second system of computers; (ii) responsive to the transfer of the first software bundle of files, requesting, by the first system of computers, through the communication network and to the second system of computers, a current version of the first file list; (iii) receiving, by the first system of computers, through the communication network and from second system of computers, the current version of the first file list; (iv) generating, by the first system of computers, a current version file list file (CVFLF) based on the current version of the first file list; and (v) storing the CVFLF at a first storage location from which the CVFLF can be downloaded.

DETAILED DESCRIPTION

Figure 1:
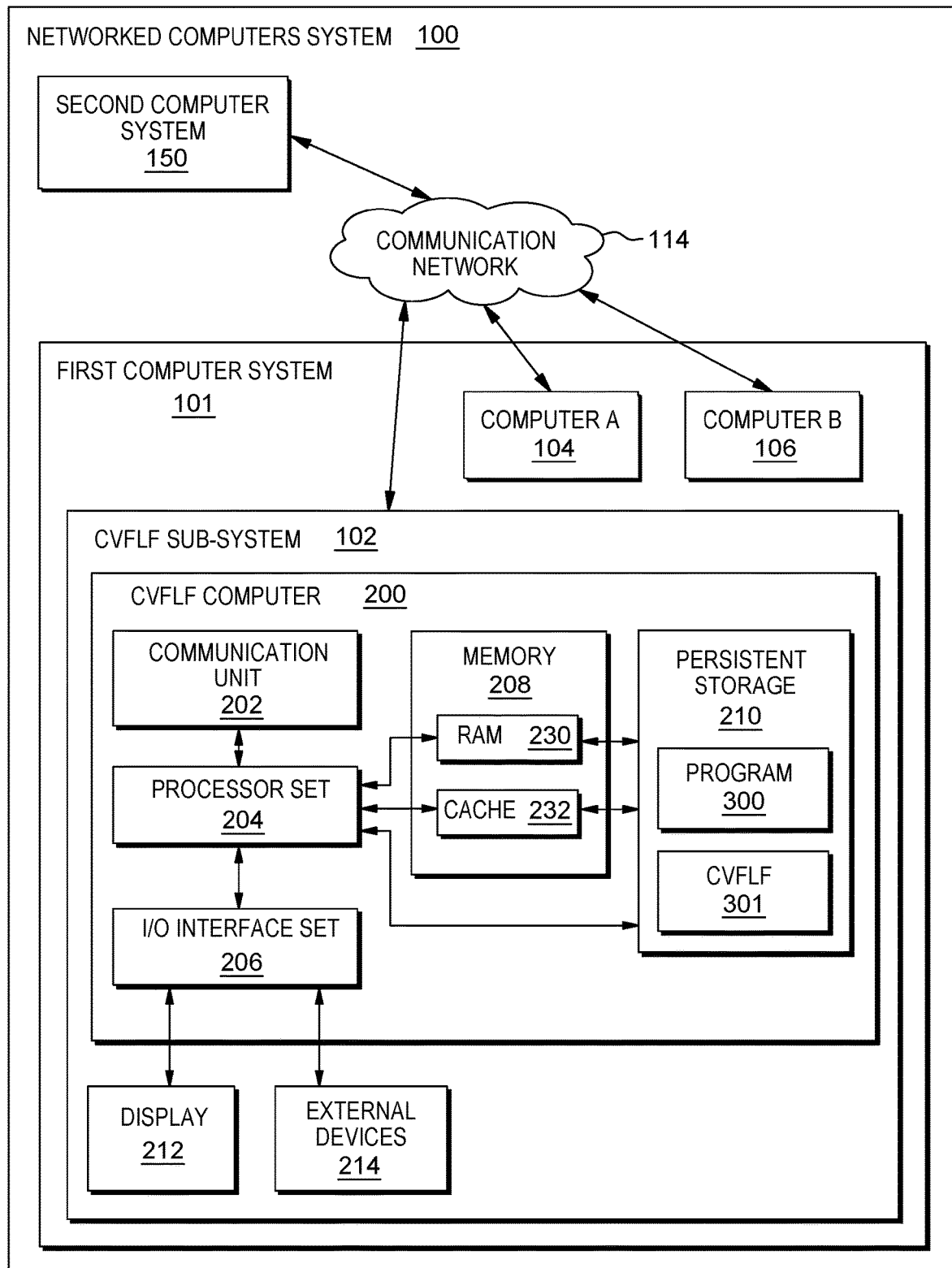
FIG. 1 is a block diagram view of a first embodiment of a system according to the present invention.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
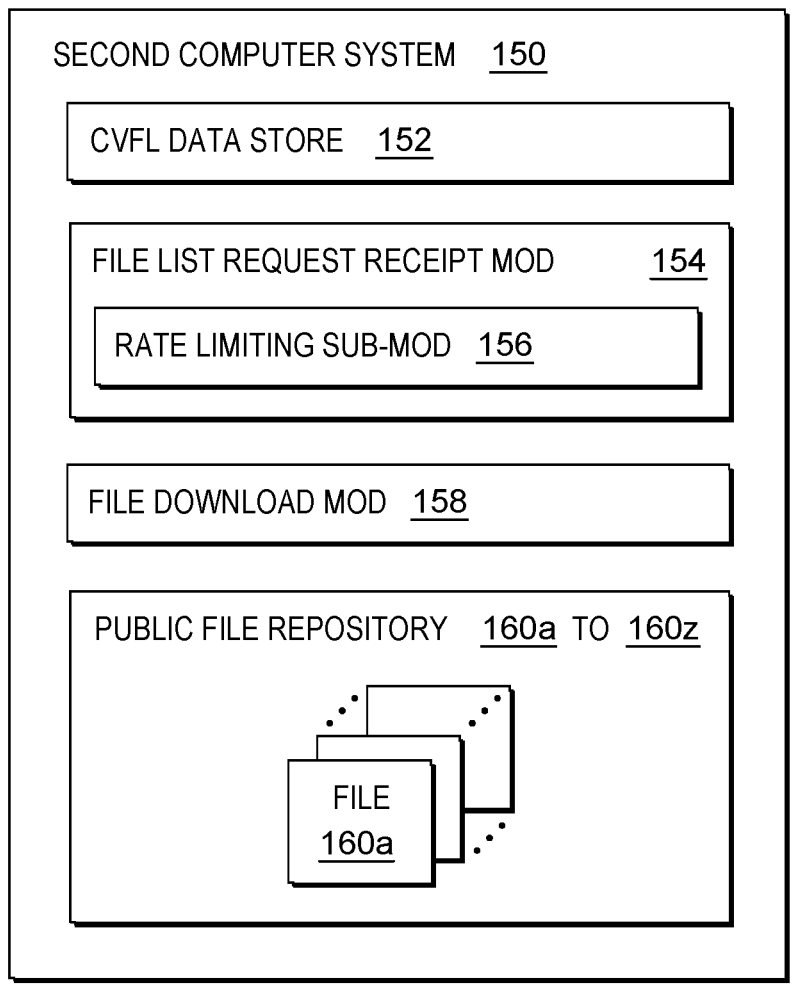
FIG. 4 is a screenshot view generated by the first embodiment system.

An embodiment of a possible hardware and software environment for software and/or methods according to the present invention will now be described in detail with reference to the Figures. FIG. 1 is a functional block diagram illustrating various portions of networked computers system 100, including: first computer system 101; second computer system 150 and communication network 114. The first computer system includes: current version of file list file (CVFLF) sub-system 102; computer A 104; computer B 106. CVFLF sub-system 102 includes: CVFLF computer 200; communication unit 202; processor set 204; input/output (I/O) interface set 206; memory device 208; persistent storage device 210; display device 212; external device set 214; random access memory (RAM) devices 230; cache memory device 232; program 300; and CVFLF 301. As shown in FIG. 4, the second computer system 150 includes: current file list data store 152; file list request receipt module ("mod") 154; rate limiting sub-mod 156; file download mod 158; and public file repository 160a to 160z.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
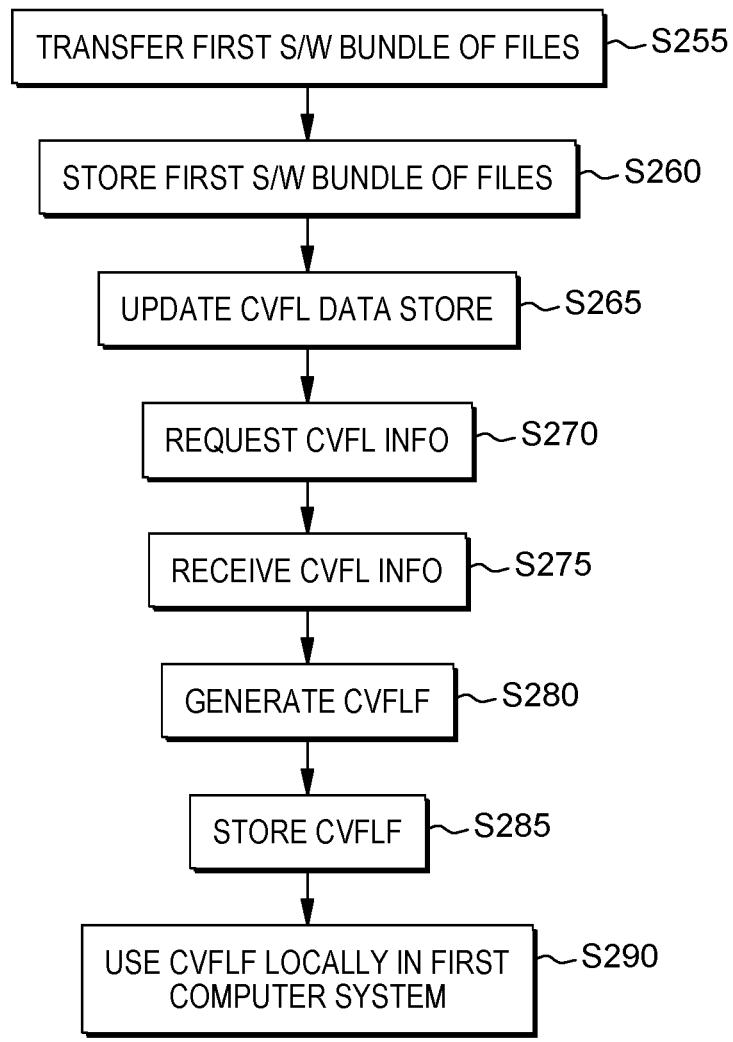
FIG. 2 is a flowchart showing a first embodiment method performed, at least in part, by the first embodiment system.
Figure 3:
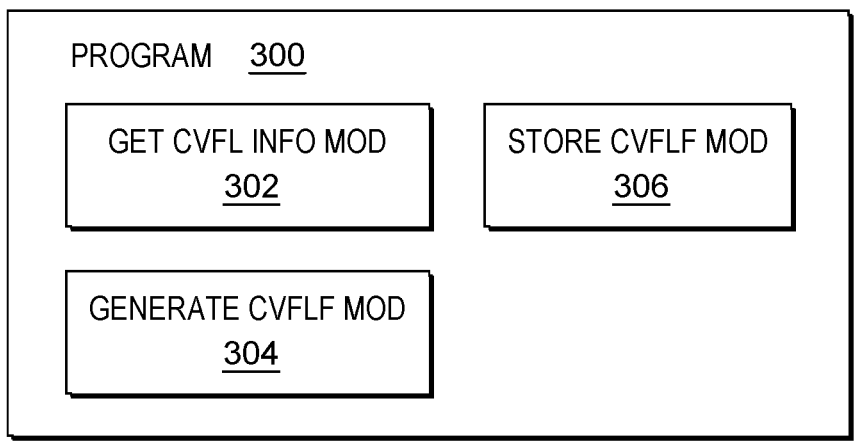
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where computer B 106 of first computer system 101 transfers a first software bundle of files to second computer system 150 (see FIG. 1).

Processing proceeds to operation S260, where second computer system 150 stores the first software bundle of files as files in public file repository 160a to 160z. By storing the files in this public repository, the first software bundle of files will now be available to the various computers in first computer system 101, as well as to other members of the public (not shown).

Processing proceeds to operation S265, where current version file list data store (CVFL data store) 152 (see FIG. 4) updates the current version of the file list for the public file repository to reflect the addition of the first software bundle of files that occurred at operation S260. In this embodiment, it is noted that operations S255, S260 and S265 are performed in the currently conventional way according to currently conventional public repository technology (for example, GitHub technology).

Processing proceeds to operation S270, where get CVFL information module ("mod") 302 of program 300 requests the current version of the file list from file list request receipt mod 154 and CVFL data store 152 of second computer system 150 (see FIG. 4). It is noted that these requests are rate limited by IP address, meaning that a single IP address may make only up to a predetermined maximum number of requests per unit time. This IP address based rate limiting is provided by rate limiting sub-mod 156 of file list request receipt mod 154 of second computer system 150 (see FIG. 4). In this embodiment the rate limiting is achieved by currently conventional technology. It is noted that computer A 104, computer B 106 and CVFLF computer 200 all share a single IP address because these computers are all owned and controlled by a single enterprise. This request for the current version of the file list by first computer system 101 is performed in response to the transfer of the first software bundle of files performed at operation S255.

Processing proceeds to operation S275, where get CVFLF info mod 302 receives the current version of the file list from CVFL data store 152 of second computer system 150 (see FIG. 4).

Processing proceeds to operation S280, where generate current version of file list file (CVFLF) mod 304 generates a file list based on the current version of the file list received at operation S275. The following sub-section of this Detailed Description section will discuss some embodiments of this type of file generation in more detail.

Processing proceeds to operation S285, where store current version file list file (store CVFLF) mod 306 stores the current version of the file list file at an accessible location CVFLF 301 in persistent storage 210 of CVFLF computer 200 of CVFLF sub-system 102 of first computer system 101. Alternatively, this CVFLF could be stored at other accessible location in first computer system 101, or even at locations outside of first computer system 101. By accessing this file, computers of first computer system 101 can determine the current version of the file list without consulting second computer system 150. This avoids the use of file list receipt request mod and the rate limiting of its rate limiting sub mod 156 (see FIG. 4).

Processing proceeds to operation S290, where the various computers of first computer system 101, such as computer A 104 and computer B 106 use CVFLF 301 to determine the current version of the file list without consulting second computer system 150 and its rate limiting. Because computers 104, 106 and 200 share a common IP address, the per IP address rate limiting of second computer system 150 could be a problem if these computers did not have non-rate limited access to CVFLF 301. Processing proceeds under operation S290 until the file list changes again to a new current version, at which point get CVFL mod 302, generate CVFLF mod 304 and store CVFLF mod 306 will update CVFLF 301 to the new current version of the file list.

III. Further Comments and/or Embodiments

Some embodiments of the present invention recognize the following facts, potential problems and/or potential areas for improvement with respect to the current state of the art: (i) multiple systems behind a single router will likely have the same public IP address, resulting in rate limits (for example, user based rate limits) for some file repositories (for example, GitHub file repositories) being reached quickly within a local automated test environment because these environments tend to make many request for data per unit time; and/or (ii) a public GitHub organization offers unlimited clone requests, but that would require one or more files within a known repository to contain up-to-date information about the GitHub organization.

Some embodiments of the present invention may include one, or more, of the following features, characteristics and/or advantages: (i) a method to build and update live data to decrease token usage when processing files in a git-based file repository; (ii) builds and maintains live data within a known GitHub repository such that it can be used in a deploy process to avoid rate limiting through a REST API service; (iii) builds and maintains live data within a known public file repository such that it can be used in a deploy process to avoid rate limiting through a REST API service; and (iv) building and maintaining live data within a known public file repository such that the component of the product responsible for loading content can load the latest software bundles without prior knowledge of what content is available to it.

Content runtime exists on a virtual machine and is made up of three pieces: the deployment manager, the pattern manager, and the software repository. A deployment manager contains the installation and configuration information to install software onto virtual machines or containers. A software repository contains the software installation packages, which are used by the deployment manager when a product is installed onto a virtual machine or container. A pattern manager orchestrates software installation on deployed virtual machines within this environment, including registering the virtual machine with the deployment manager, populating configuration for the deployment in the deployment manager, and starting the install request with the deployment manager. A public file repository contains groupings of files, also called repositories. File repositories belong to a parent organization. REST API requests to the file repository are typically rate limited (for example, rate limited on a per user basis), but file downloads typically do not have a rate limit.

Figure 5:
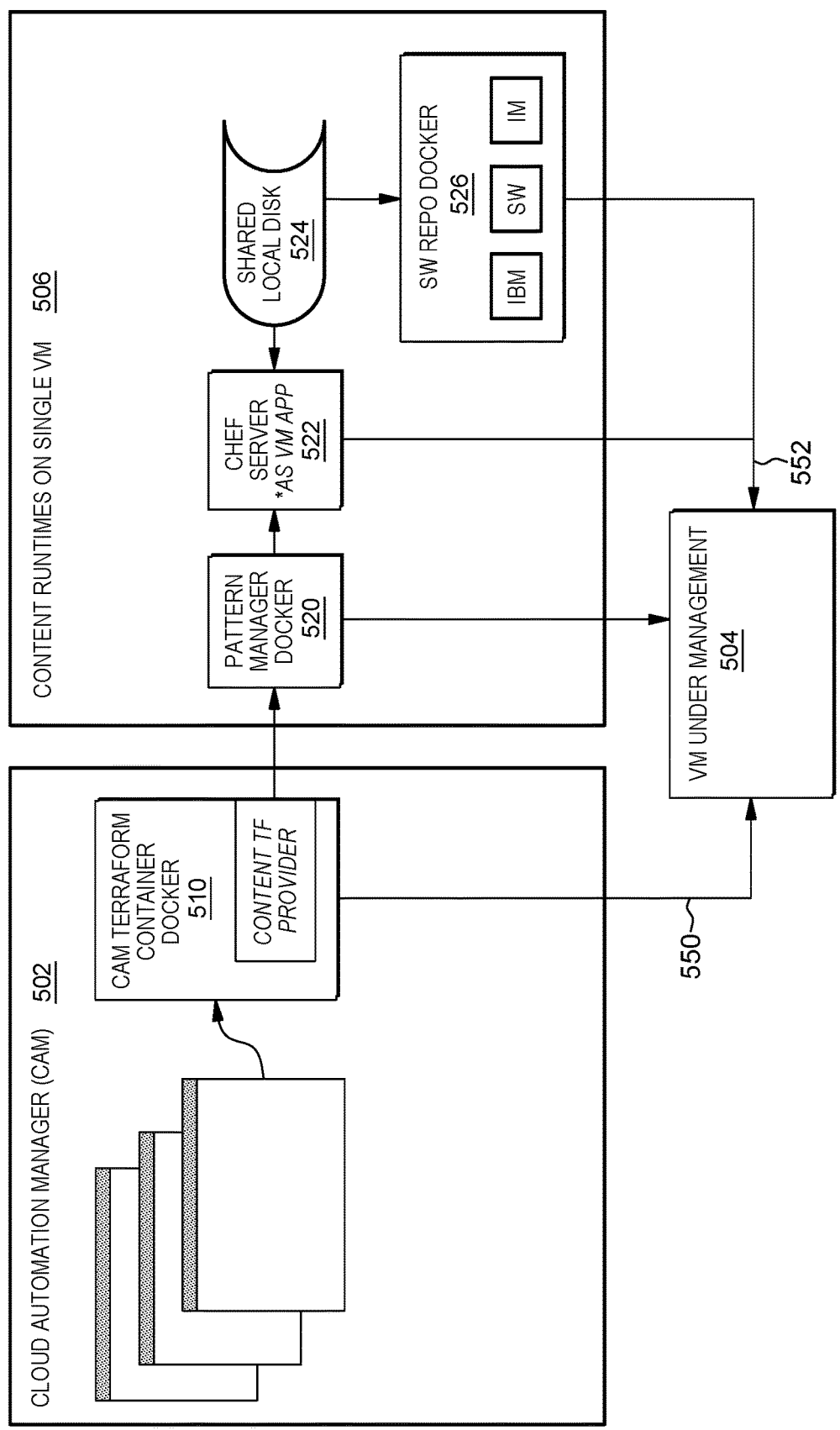
FIG. 5 is a block diagram view of a second embodiment of a system according to the present invention.

FIG. 5 shows an automated test system 500 including: cloud automation manager (CAM) block 502 (including CAM terraform container 510); VM under management block 504; and content runtimes on single VM block 506 (including pattern manager 520, chef server 522, shared local disk 524 and software repository block 526). Content runtimes on single VM block 506 is network addressable to VM under management 504. Data communication path 550 is used to create VM initiation secure shell keys remote functions. Data communication path 552 is used for CHEF and software integration.

Figure 6:
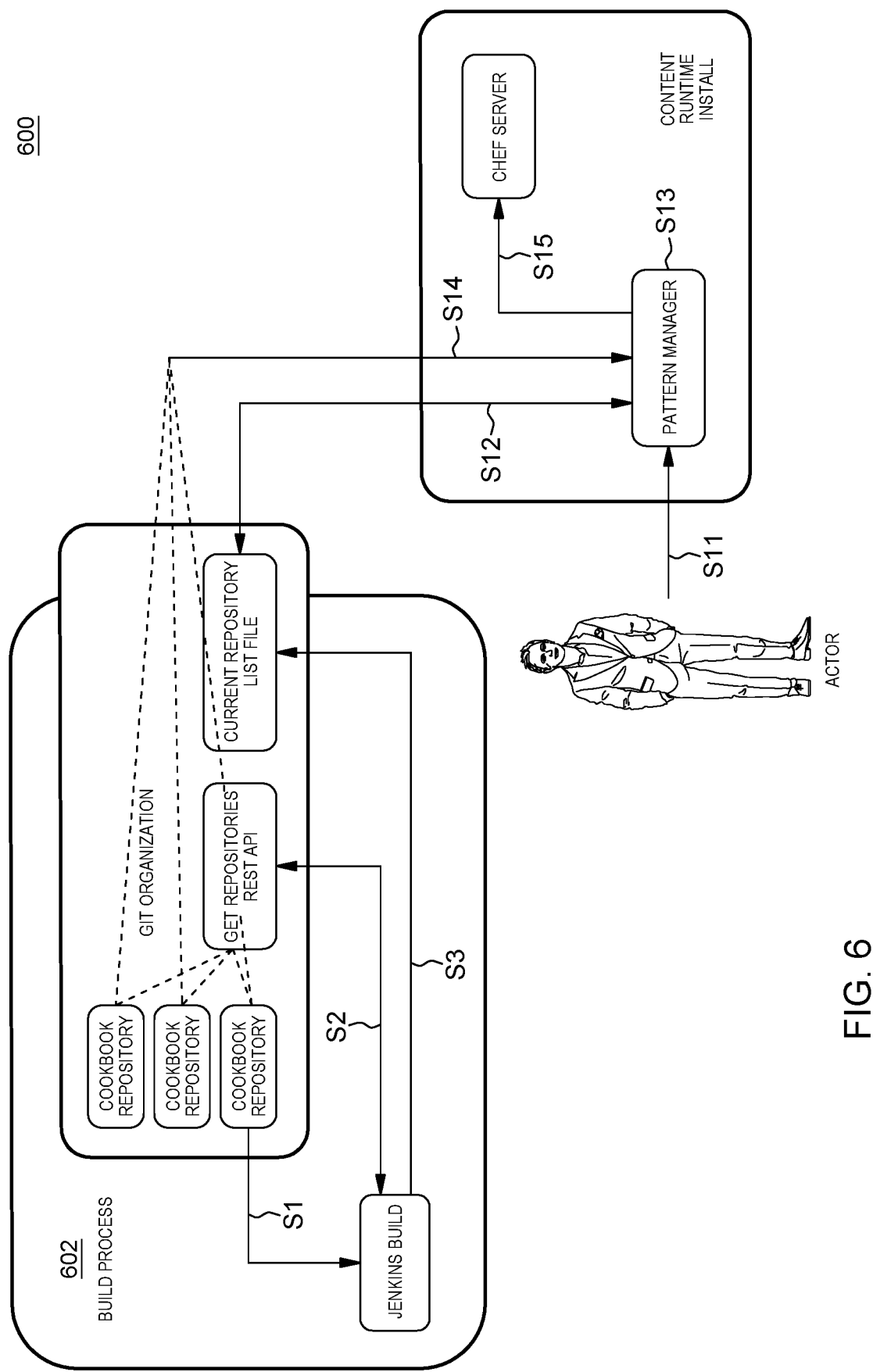
FIG. 6 is a flowchart showing a second embodiment method performed, at least in part, by the second embodiment system.

Block diagram 600 of FIG. 6 shows build process 602 and a content runtime process. Build process 602 includes the following operations: cookbook repository updated S1; get current repository list S2; and update repository list S3. The content runtime install process includes the following operations: load request S11; clone repository list S12; pattern manager S13; clone repositories S14; and upload cookbooks to chef server S15. The content runtime install process: (i) installs the deployment manager, the pattern manager, and the software repository; and (ii) includes a request to the pattern manager to download the software bundles from the public file repository and into the deployment manager.

A currently conventional content runtime install process includes the following operations: (a) query the public file repository for a list of software bundle file groupings using the public file repository's REST API service; (b) parse the JSON (javaSccript Object Notation) response and find all matching groupings; (c) download each of the matching repositories locally using data retrieved from the JSON output; and (d) upload all local repositories to the deployment manager. In some embodiments of the present invention, the REST API request of operation (a) is replaced with the following: each time that a software bundle is transferred from an enterprise's internal file repository to the public file repository, a job is started that makes the REST API request to the public file repository to retrieve the latest list of software bundle file groupings. The JSON response is parsed and any unnecessary properties are removed. The resulting JSON is output to a file and loaded into a known location in the public file repository. When a request is made to the pattern manager to load one or more software bundles from the public file repository, the file containing the JSON file that was created during the build process is downloaded and then used as if it had come from the public file repository REST API request. This process takes advantage of the unlimited file download requests to avoid rate limiting by the public file repository REST APIs.

According to an embodiment of the present invention, a method of downloading files from a public repository to an internal repository includes the following operations (not necessarily in the following order): (a) query the public file repository for a list of software bundle file groupings by: (i) each time that a software bundle is transferred from the internal file repository to the public file repository, a job is started that makes the REST API request to the public file repository to retrieve the latest list of software bundle file groupings, (ii) the JSON response is parsed and any unnecessary properties are removed, (iii) the resulting JSON is output to a file and loaded into a known location in the public file repository, and (iv) when a request is made to the pattern manager to load one or more software bundles from our public file repository, download the file containing the JSON file that was created during the build process and use it as it came from the public file repository REST API request; (b) parse the JSON response and find all matching groupings; (c) download each of the matching repositories locally using data retrieved from the JSON output; and (d) upload all local repositories to the deployment manager.

IBM Cloud Automation Manager provides pre-loaded software content in the form of Terraform templates and Chef cookbooks. Each of these Chef cookbooks resides in its own repository on GitHub and is loaded into the Chef server on or being managed by the Cloud Automation Manager content runtime during the content runtime deploy process.

The content runtime install process includes a request to the pattern manager to download the Chef cookbooks from GitHub and into the Chef server. According currently conventional methods, this is done in the following steps: (a) query the specified GitHub organization for a list of its repositories by using a GitHub REST API; (b) parse the JSON response and find all matching repositories; (c) clone each of the matching repositories locally using data retrieved from the JSON output; and (d) upload all local repositories to the Chef server. In some embodiments of the present invention, the REST API request in step (a) with the following: (a)(i) each time that a Chef cookbook is updated in our GitHub organization, a job is started that makes the REST API request to GitHub to retrieve a list of repositories; (a)(ii) the JSON response is parsed and any unnecessary properties are removed; (a)(iii) the resulting JSON is output to a file and loaded into a known repository in GitHub; and (a) (iv) when a request is made to the pattern manager to load one or more cookbooks from our GitHub organization, the repository containing the JSON file created during the build is cloned and then used as if it came from the GitHub REST API request. This process allows us to take advantage of the unlimited clone requests to avoid rate limiting by the GitHub REST APIs.

Some embodiments of the present invention may include one, or more, of the following features, characteristics and/or advantages: (i) creates a dynamic map of the components available for download/installation (that is, the state of the system); (ii) saves, or caches, a response that contains the latest state of the system; (iii) performs a comparison of whether or not a component needs an update on the system itself without any input from an external service; and/or (iv) building of repository data based on current state of many file repositories.

The foregoing descriptions have made references to "live data." This concept of "live data" will now be discussed in more detail. In some embodiments, the live data is just a list of repositories. More generally, "live data," as that term is used herein means either the latest data or current data. More specifically, in some embodiments, the rate-limited API that is called to retrieve repository information related to list organization repositories, which are list repositories for the specified org. The following instruction may be used in this connection: GET /orgs/:org/repos. Some parameters associated with this instruction may include: (i) type (for example, can be one of all, public, private, forks, sources, member, with default: all); (ii) sort (for example, can be one of created, updated, pushed, full_name, with default: created); and (iii) direction (for example, can be one of asc or desc, with default: when using full_name: asc, otherwise desc). Live data is the most up to date information about which repositories exist in a public repository (for example, GitHub) for a given software product.

Originally, each customer's "content runtime" (a component of a software product) would call the API described in the previous paragraph with a filter that attempts to limit the returned repository identities to only relevant repositories (for example, filtering to restrict to all repositories in a given organization that start with the string "cookbook_). This currently conventional technique causes a dump of data for each repository that matches the filter, and typically applies against a-per-IP-address rate limit (that is, a form of per-user rate limit). In contradistinction, some embodiments of the present invention make that same API call, but only make that call in the build (and not as part of content runtime) when a product (for example, a cookbook product) is updated. So, instead of each individual end user making one call to retrieve all of that information, a single call is made during the build phase and the returned data (that is, a set of repositories) is output it to a file to be stored locally and consulted as necessary and/or helpful. The repository data that is kept is typically a subset of the information that retrieved using the type of API GET instruction described in the previous paragraph. Now, instead of individual end users making a call to the rate-limited API, a customer makes a call to download the file that has previously been populated at build time by an entity that employs the end users. Either this request that is not rate limited, or, in some cases, the rate limits are present, but not problematic, because relatively few requests are being made at build time because a great multiplicity of end users are not yet using the set of repository(ies) because they have not yet been built.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) for use by a first system of computers sharing a common IP address, the CIM comprising:

transferring, from the first system of computers, through a communication network and to a second system of computers that stores a first file repository, a first software bundle of files so that: (i) the first software bundle of files is stored in and is downloadable from the first file repository, and (ii) the first bundle of files is added to a first file list for the first file repository stored in the second system of computers;

responsive to the transfer of the first software bundle of files, requesting, by the first system of computers, through the communication network and to the second system of computers, a current version of the first file list;

receiving, by the first system of computers, through the communication network and from the second system of computers, the current version of the first file list;

performing a build process to generate, by the first system of computers, a current version file list file (CVFLF) based on the current version of the first file list, with the generation of the CVFLF including generating a JSON (JavaScript Object Notation) file including information indicative of the CVFLF;

storing the CVFLF at a first storage location from which the CVFLF can be downloaded;

receiving, by the first storage location, over a communication network and from a first requester, a request to download the CVFLF; and responsive to the receipt of the request, sending, by the first storage location, over the communication network and to the first requester, the CVFLF as the file containing a JSON file that was created during the build process; and downloading, by the first requester, the CVFLF from the first storage location as a file including the file containing a JSON file that was created during the build process in order to avoid requesting the current version of the first file list using a rate limited REST (representational state transfer) API (application programming interface).

2. The CIM of claim 1 wherein the downloading of the CVFLF from the first storage location as a file including the file containing a JSON file is not rate limited.

3. The CIM of claim 1 wherein:
the first system of computers hosts an automated test environment; and
the second system of computers hosts a public file repository.

4. The CIM of claim 1 wherein the first system of computers hosts an automated test environment.

5. The CIM of claim 1 wherein the second system of computers hosts a public file repository.

6. A computer program product (CPP) for use by a first system of computers sharing a common IP address, the CPP comprising:
a storage medium; and
computer code stored on the storage medium, with the computer code including data and instructions for causing a processor(s) set to perform at least the following operations:
transferring, from the first system of computers, through a communication network and to a second system of computers that stores a first file repository, a first software bundle of files so that: (i) the first software bundle of files is stored in and is downloadable from the first file repository, and (ii) the first bundle of files is added to a first file list for the first file repository stored in the second system of computers, responsive to the transfer of the first software bundle of files, requesting, by the first system of computers, through the communication network and to the second system of computers, a current version of the first file list, receiving, by the first system of computers, through the communication network and from the second system of computers, the current version of the first file list, performing a build process to generate, by the first system of computers, a current version file list file (CVFLF) based on the current version of the first file list, with the generation of the CVFLF including generating a JSON (JavaScript Object Notation) file including information indicative of the CVFLF, storing the CVFLF at a first storage location from which the CVFLF can be downloaded, receiving, by the first storage location, over a communication network and from a first requester, a request to download the CVFLF, and responsive to the receipt of the request, sending, by the first storage location, over the communication network and to the first requester, the CVFLF as the file containing a JSON file that was created during the build process, and downloading, by the first requester, the CVFLF from the first storage location as a file including the file containing a JSON file that was created during the build process in order to avoid requesting the current version of the first file list using a rate limited REST (representational state transfer) API (application programming interface).

7. The CPP of claim 6 wherein the downloading of the CVFLF from the first storage location as a file including the file containing a JSON file is not rate limited.

8. The CPP of claim 6 wherein:
the first system of computers hosts an automated test environment; and
the second system of computers hosts a public file repository.

9. The CPP of claim 6 wherein the first system of computers hosts an automated test environment.

10. The CPP of claim 6 wherein the second system of computers hosts a public file repository.

11. A first system of computers (FSC) sharing a common IP address, the CS comprising:
a processor(s) set;
a storage medium; and
computer code stored on the storage medium, with the computer code including data and instructions for causing the processor(s) set to perform at least the following operations:

transferring, from the first system of computers, through a communication network and to a second system of computers that stores a first file repository, a first software bundle of files so that: (i) the first software bundle of files is stored in and is downloadable from the first file repository, and (ii) the first bundle of files is added to a first file list for the first file repository stored in the second system of computers, responsive to the transfer of the first software bundle of files, requesting, by the first system of computers, through the communication network and to the second system of computers, a current version of the first file list, receiving, by the first system of computers, through the communication network and from the second system of computers, the current version of the first file list, performing a build process to generate, by the first system of computers, a current version file list file (CVFLF) based on the current version of the first file list, with the generation of the CVFLF including generating a JSON (JavaScript Object Notation) file including information indicative of the CVFLF, storing the CVFLF at a first storage location from which the CVFLF can be downloaded, receiving, by the first storage location, over a communication network and from a first requester, a request to download the CVFLF, responsive to the receipt of the request, sending, by the first storage location, over the communication network and to the first requester, the CVFLF as the file containing a JSON file that was created during the build process, and downloading, by the first requester, the CVFLF from the first storage location as a file including the file containing a JSON file that was created during the build process in order to avoid requesting the current version of the first file list using a rate limited REST (representational state transfer) API (application programming interface).

12. The FSC of claim 11 wherein the downloading of the CVFLF from the first storage location as a file including the file containing a JSON file is not rate limited.

13. The FSC of claim 11 wherein:
the first system of computers hosts an automated test environment; and
the second system of computers hosts a public file repository.

14. The FSC of claim 11 wherein the first system of computers hosts an automated test environment.

15. The FSC of claim 11 wherein the second system of computers hosts a public file repository.

* * * * *